(No Model.) 3 Sheets—Sheet 1.

P. J. KUHBACHER.
AUTOMATIC ELECTRIC SCALE.

No. 485,950. Patented Nov. 8, 1892.

WITNESSES:
Fred G. Dieterich
Edw. W. Byrn

INVENTOR:
Paul Joseph Kuhbacher
BY
ATTORNEYS (No Model.) 3 Sheets—Sheet 2.

P. J. KUHBACHER.
AUTOMATIC ELECTRIC SCALE.

No. 485,950. Patented Nov. 8, 1892.

WITNESSES:
Fred G. Dieterich
Edw. W. Byrn

INVENTOR:
Paul Joseph Kuhbacher
BY
ATTORNEYS

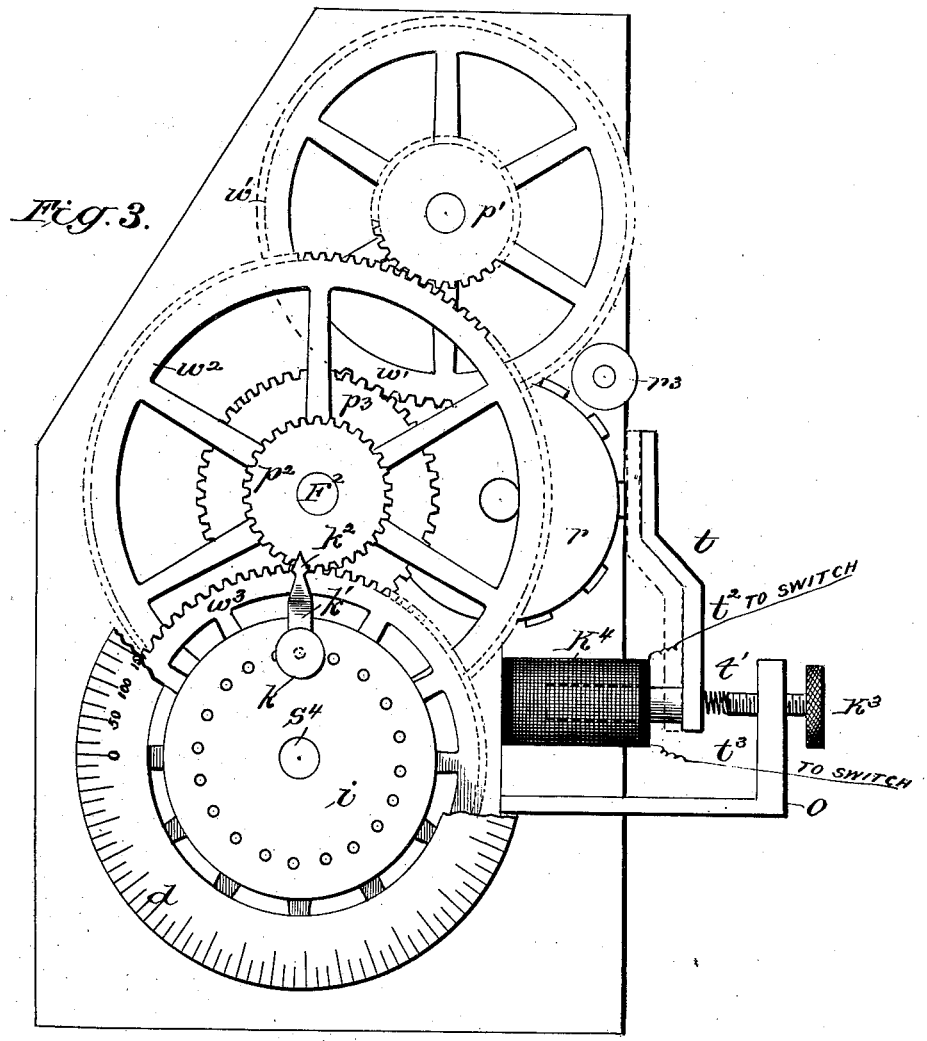

UNITED STATES PATENT OFFICE.

PAUL JOSEPH KUHBACHER, OF ASHLAND, KENTUCKY.

AUTOMATIC ELECTRIC SCALE.

SPECIFICATION forming part of Letters Patent No. 485,950, dated November 8, 1892.

Application filed March 24, 1892. Serial No. 426,309. (No model.)

*To all whom it may concern:*

Be it known that I, PAUL JOSEPH KUHBACHER, residing at Ashland, in the county of Boyd and State of Kentucky, have invented a new and Improved Automatic Electric Scale, of which the following is a specification.

My invention is an improved electric weighing-scale, in which the poise is run out to a perfect balance on the scale-beam and the weighing effected automatically as the load is placed upon the scales and the weight recorded by printing at the same time. These scales are mainly intended for use as track-scales for weighing railroad-cars and their contents, but are applicable generally for automatic weighing.

It is an improvement in that class of automatic weighing-scales in which the poise is attached to a flexible connection running parallel to the scale-beam and passing around pulleys, which flexible connection is moved to adjust the poise by an electric motor; and it consists in the features of improvement which I will now proceed to fully describe, with reference to the drawings, in which—

Figure 1:
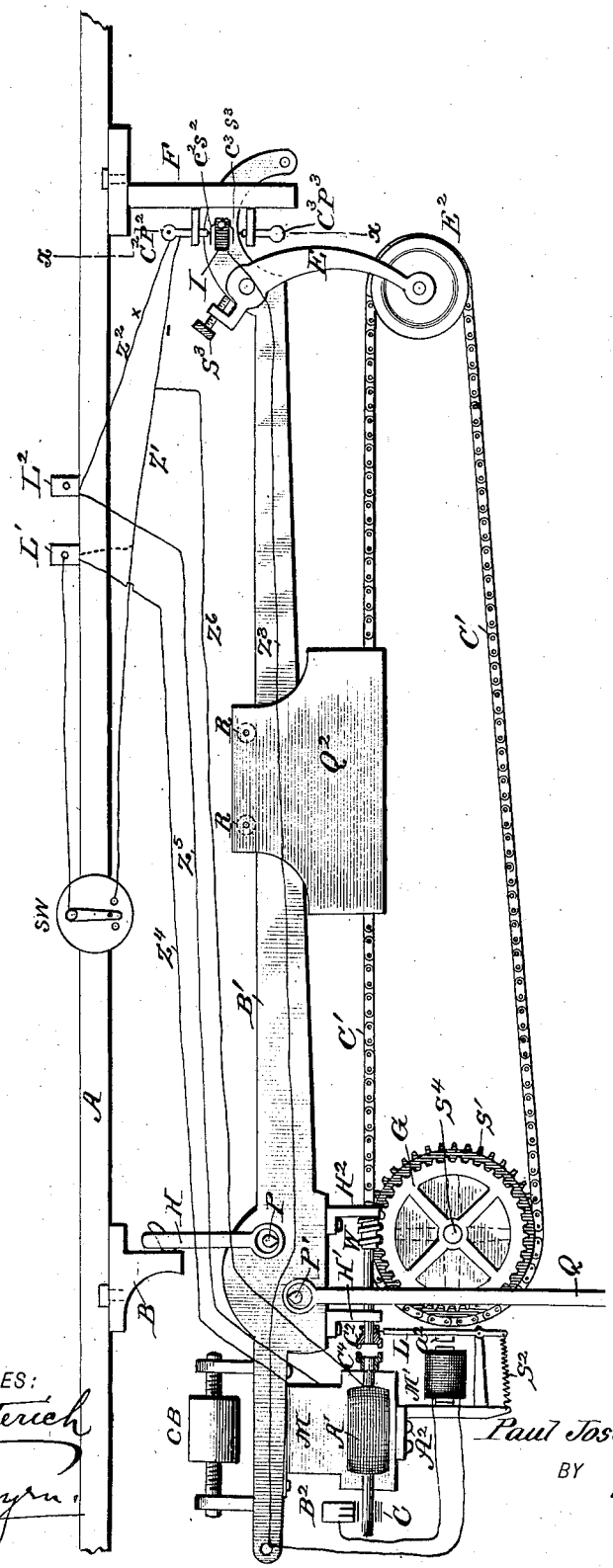
Figure 2:
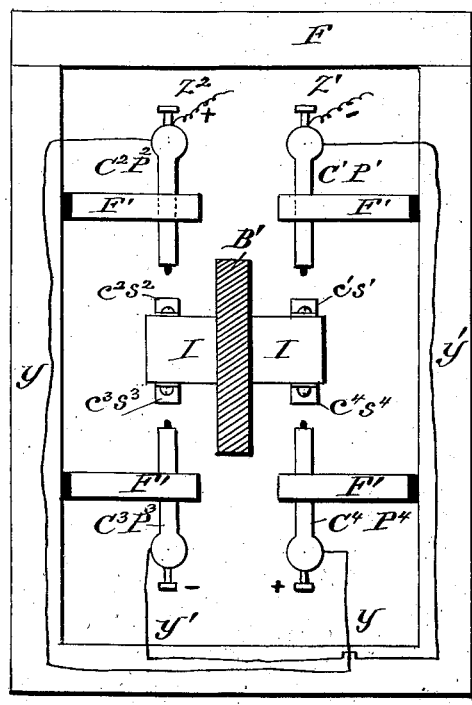
Figure 4:
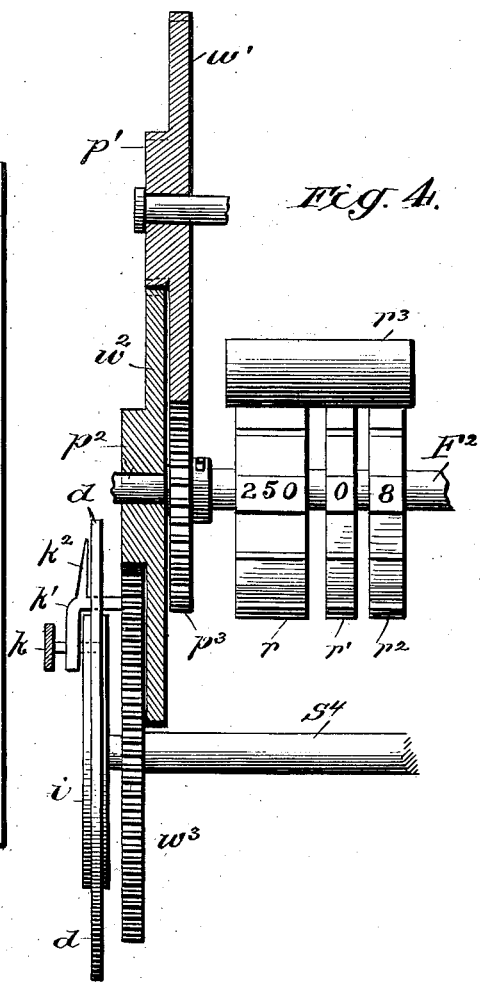

Figure 1 is a side view of the devices applied to the scale-beam. Fig. 2 is a sectional view taken through the line $x\ x$ of Fig. 1. Fig. 3 is a side view of the printing devices, and Fig. 4 is a sectional edge view of the same.

In the drawings, A represents a part of the timber or framework of the scale-box, to the under side of which is bolted a bracket B, upon which is suspended the link H, and in the eyes of which are sustained the fulcrum-lugs P of the scale-beam B'. This scale-beam at its outer end plays, as usual, in a pendent frame F and upon the opposite sides of its fulcrum-lugs P is provided with other lugs P', which connect with the rod Q, extending downwardly to the platform and system of levers upon which the load is placed, and through which rod the strain is transmitted to the scale-beam.

C' is an endless chain belt which is attached to the poise $Q^2$, which rests by means of rollers R R upon the scale-beam B' and moves easily thereon. This chain belt at one end passes around the sprocket-wheel S', from which it derives its motion, and at the other end passes around a wheel or pulley $E^2$, carried by a pivoted and pendent lever-hanger E, fulcrumed upon the outer end of the scale-beam and provided with a set-screw $S^3$, by means of which the lever-hanger E may be adjusted about its fulcrum to increase the tension or take up slack in the chain belt for a positive and sensitive movement of the poise in starting in either direction. The sprocket-wheel S' is rigidly fastened to the shaft $S^4$, and is also rigidly connected to the worm-wheel G, arranged beside the sprocket-wheel. In the periphery of this worm-wheel there meshes the worm W, whose shaft is journaled in hangers H' $H^2$, bolted to the scale-beam. On the outer end of the worm-shaft there slides a clutch-section $C^2$, which, while revolving with the shaft, is free to slide thereon longitudinally. This clutch-section corresponds to and is in axial line with another clutch-section $C^4$ on the end of the shaft of the armature A' of the electric motor. This clutch is a friction-clutch, and when section $C^2$ is projected against $C^4$ the rotation of the armature of the motor is transmitted to the worm-shaft, and motion is thus imparted to the poise.

M are the field-magnets of the motor, which are fastened to the short end of the scale-beam and carry the armature at their lower ends.

$B^2$ and C are the brushes of the armature, and $A^2$ is a bracket fastened to the motor and carrying at its lower end a magnet M', acting upon an armature $a^2$. This armature is mounted upon a tilting lever L, which at its upper end loosely embraces the grooved collar of the clutch-section $C^2$ and at its lower end below its fulcrum is attached to a spring $S^2$, whose tension serves to pull the armature away from the magnet and break connection between the two sections of the friction-clutch.

C B is a counterbalance mounted upon the short end of the scale-beam to adjust the scale-beam and its attachments to a proper balance. At the outer end of the scale-beam upon each side of its curve or goose-neck is an insulating-block I. (See Fig. 2.) These bear on their upper sides and on opposite sides of the scale-beam contact-springs c' s' and $c^2\ s^2$, adapted to touch the contact-points C' P' and $C^2\ P^2$, while below these insulating-blocks are other contact-springs $c^3\ s^3$ and $c^4\ s^4$, adapted to touch the contact-points $C^3\ P^3$ and $C^4\ P^4$. These four contacts $C'\ P'$ to $C^4\ P^4$ are carried by insulated horizontal arms $F'$ from the frame F, and the contact-points above the beam are connected to the ones below the beam by wires $y$ and $y'$ for a reversal of their polarity—i. e., contact $C^2\ P^2$ is connected by wire $y$ to contact $C^4\ P^4$ on the opposite side and below the scale-beam, and so, also, the contact-points $C'\ P'$ and $C^3\ P^3$ are connected by wire $y'$.

The circuit connections are made as follows: The binding-posts $L'\ L^2$ receive the current from the battery or dynamo, and wires $Z^4\ Z^5$ constantly carry a portion of this current to the field-magnets M, which are thus constantly kept energized. From these same binding-posts two other wires $Z'\ Z^2$ carry another portion of the current to the working parts of my device. This current may be first taken through a switch S W, or it may be taken by a direct connection of wire $Z'$ to binding-post $L'$, as shown by the dotted lines. These two wires $Z'\ Z^2$ lead to the upper contacts $C'\ P'$ $C^2\ P^2$, and thence by crossed wires to the contacts $C^3\ P^3\ C^4\ P^4$ below of reversed polarity. The contact-springs $c'\ s'$ to $c^4\ s^4$ are connected to wire $Z^3$, which runs to magnet $M'$, thence to brush $B^2$ through the armature $A'$, and thence through wire $Z^6$ to $Z'$. Now when a perfect balance of the scale-beam is attained none of the four contact-springs $c'\ s'$ to $c^4\ s^4$ touch either the contacts above or below, and hence no current from the wires $Z'\ Z^2$ can pass, and the current only passes through wires $Z^4\ Z^5$ to the field-magnets, which thus attractively hold the armature $A'$ so that it cannot continue to run from momentum after the armature-circuit is broken. If the scale-beam rises, the upper contact-springs $c'\ s'\ c^2\ s^2$ rise and touch contact-points $C'\ P'\ C^2\ P^2$, and the current then flows from $Z^2$ to $C^2\ P^2$ to $c^2\ s^2$ to $Z^3$ to magnet $M'$, through armature $A'$ to $Z^6$, and back to $Z'$, causing armature to turn in a given direction and causing magnet $M'$ to close clutch $C^2\ C^4$, and by rotating worm W moves the poise toward a balance. If the scale-beam be down, contact-springs $c^3\ s^3\ c^4\ s^4$ touch the lower contacts $C^3\ P^3\ C^4\ P^4$ and the same circuit is made, except that the current is by the reversal of the poles (see Fig. 2) sent through the armature in the opposite direction and the latter is turned in the reverse direction to reverse the movement of the poise in establishing the balance necessary for weighing, in which the contact-springs do not touch the contact-points either above or below and the circuit through the armature is broken, as first described. By introducing the magnet $M'$ and the friction-clutch $C^2\ C^4$ it will be seen that the momentum of the armature cannot throw the poise beyond its proper weighing position, as connection is instantly broken by the clutch and the worm W instantly locks any momentum that may exist in the poise or belt wheels. This construction also avoids the objection to the use of a screw-shaft acting directly on the poise, whose threads are liable to get rusty and whose length and speed of revolution allow the shaft to chatter or vibrate.

The printing devices shown in Figs. 3 and 4 are mounted upon and operated mechanically by the shaft $S^4$ in Fig. 1 and electrically by the switch S W of Fig. 1.

Referring to Figs. 3 and 4, which show at $S^4$ a portion of the sprocket-wheel shaft, $i$ is a disk fixed to the said shaft and provided with a circular series of holes, by means of which the poise-actuating devices are connected to the printing devices. On the shaft $S^4$, beside the rigid disk $i$, is a loose gear-wheel $w^3$, which has a bracket-arm $k'$ extending over the disk, and through which a screw $k$ is tapped and is adapted to enter one of the circular series of holes in the disk to connect this loose wheel $w^3$ to the shaft $S^4$ or disconnect it, as may be desired. This loose gear-wheel $w^3$ engages with a pinion $p^2$, rigidly fixed to a larger gear-wheel $w^2$, both of which revolve loosely on the shaft $F^2$. This gear-wheel $w^2$ engages another pinion $p'$ above, which is rigidly attached to another gear-wheel $w'$, and which latter engages a pinion $p^3$, rigidly fixed to the shaft $F^2$, that carries the numbering-wheels $r\ r'\ r^2$, which are arranged in any suitable manner for a ten-to-one motion to correspond with their decimal positions. The first wheel $r$ for railroad uses increases by fifty and is numbered from "50" to "950." The next wheel represents thousands and the next tens of thousands. On the bracket $k'$ is a pointer $k^2$, which travels over the numbered scale $d$ and indicates the number to be printed by the wheels $r\ r'\ r^2$.

$K^4$ is a hollow magnet whose core is adjustable and is attached to the printing-plate $t$, which presses the paper to be printed on between it and the raised numbers on the wheels $r\ r'\ r^2$, the said numbers being inked by a roller $r^3$. The core of the magnet $K^4$ and the attached press-plate $t$ are drawn inwardly during the printing movement by the action of the magnet and are drawn outwardly by the spring $t'$, whose tension is adjusted by the set-screw $K^3$, tapped through the bracket-arm O. By this construction of magnet a firm impression is made on the paper without any limitation to the movement of the press-plate as would ordinarily be afforded by the fixed core of the magnet.

The object in having the registering and printing device separated from the weighing devices by means of the screw $k$ and disk $i$ is to enable the printing apparatus to print only the net weight of the load in the car, and for this purpose when a car of known weight (say fifteen thousand pounds) runs upon the scales the screw $k$ is detached from disk $i$ and the pointer $k^2$ is turned back fifteen thousand pounds, and then the disk $i$ and wheel $w^3$ are again connected, so that while the whole load (car and contents) will be weighed (and shown on the scale-beam) the printing apparatus will only print the net weight of the load without that of the car. For the mechanical operation of the printing and registering device this, it will be seen, is effected automatically through shaft $S^4$ by the weighing devices; but for the energizing of the magnet $K^4$ to effect the printing this is effected by the switch S W, Fig. 1, which connects with the wires $t^2$ $t^3$, Fig. 3, or it may be also effected automatically.

Having thus described my invention, what I claim, and desire to secure by Letters Patent, is—

1. The combination, with a scale-beam and its poise, of an endless belt attached to the poise, a sprocket-wheel for rotating the belt, and an electric motor, with revolving armature and automatic circuit-closing devices, for rotating the sprocket-wheel in either direction, substantially as shown and described.

2. In an automatic electric weighing-scale, the combination, with the poise-actuating devices and the electric motor, of a clutch interposed between the two and an electro-magnet placed in the circuit of the motor and acting upon the clutch to open the same when the current is broken in the motor, substantially as shown and described.

3. In an automatic electric weighing-scale, the combination, with the poise, of an endless belt for moving it, a worm-wheel and worm for rotating the belt-wheel, the electric motor, a clutch arranged between the motor and the worm, and an electro-magnet placed in the circuit of the motor and arranged to open the clutch and at the same time allow the worm to arrest the momentum of the poise-actuating mechanism, substantially as shown and described.

4. The combination, with the poise and scale-beam and an endless belt for operating the poise, of an adjustable lever-hanger fulcrumed upon the scale-beam and provided at its upper end with a set-screw and at its lower end a pulley for regulating the tension of and removing slack from the endless belt, substantially as shown and described.

5. The combination, with an automatic electric weighing-scale, of a printing device connected to and operated by the weighing devices and an adjustable connection for gearing these two parts together or disconnecting and moving one of these parts back in relation to the other to compensate for the known weight of the car and only print the net weight of load, substantially as shown and described.

6. The combination, with the endless belt moving the poise and its actuating sprocket-wheel, of the shaft $S^4$, rigidly attached thereto and having rigid disk $i$ with holes, the loose gear-wheel $w^3$, having bracket-arm, with pointer and screw $k$ for connecting and disconnecting the rigid disk, and the printing-gears connected to the loose wheel $w^3$, substantially as and for the purpose described.

7. The combination, with the printing-wheels and a hollow magnet, of a movable core having attached to it a press-plate reaching up to the printing-wheels and a spring for withdrawing the core and press-plate, substantially as and for the purpose described.

The above specification of my invention signed by me in the presence of two subscribing witnesses.

PAUL JOSEPH KUHBACHER.

Witnesses:
 EDWD. W. BYRN,
 SOLON C. KEMON.